United States Patent [19]

Bonnet et al.

[11] 4,239,868
[45] Dec. 16, 1980

[54] CROSS-LINKABLE STRUCTURALLY COLORED POLYMERS, THEIR PREPARATION AND THEIR USE IN COMPOSITIONS FOR COATINGS

[75] Inventors: Evelyne J. M. Bonnet, Mont Saint Aignan; Philippe Y. E. Gangneux, Bihorel, both of France

[73] Assignee: Produits Chimiques Ugine Kuhlmann, Paris, France

[21] Appl. No.: 871,912

[22] Filed: Jan. 24, 1978

[30] Foreign Application Priority Data

Jan. 28, 1977 [FR] France ............................ 77 02390

[51] Int. Cl.³ ..................... C08L 33/08; C08L 39/04
[52] U.S. Cl. ........................... 525/279; 204/159.14; 427/54.1; 428/461; 428/511; 525/260; 525/261; 525/263; 525/282; 525/284; 525/289; 525/291; 525/292; 525/293; 525/301; 525/305
[58] Field of Search ............ 260/885, 42.21, 142.52, 260/42.52; 526/292, 271; 525/260, 261, 263, 279, 282, 289, 291, 292, 293, 301

[56] References Cited

U.S. PATENT DOCUMENTS 4,016,133  4/1977  Hyosu et al. .................. 260/42.21

FOREIGN PATENT DOCUMENTS 1262092  2/1972  United Kingdom .................. 260/42.21

Primary Examiner—J. Ziegler
Attorney, Agent, or Firm—Beveridge, DeGrandi, Kline & Lunsford

[57] ABSTRACT

Structurally colored polymers, formed by polymerizing monomers of the acrylic type, containing 0.5% to 20% by weight of dyestuff in copolymerized form or grafted form which have a number-average molecular weight between 1000 and 12,880 g. and contain m hydroxy functions and n groups of the formula:

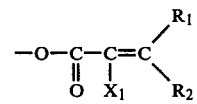

in which
  $X_1$ is hydrogen, chlorine, bromine or methyl;
  and $R_1$ and $R_2$ are the same or different and represent hydrogen, chlorine, methyl, phenyl, substituted phenyl or carboxyl;
  m being a number from 0 to 49
  and n being a number from 2 to 70
  such that the sum m+n is from 7 to 70
  and the ratio m/n is from 0 to 2.4.

These polymers are used in particular for the formation of colored coating on various supports and surfaces.

7 Claims, No Drawings

CROSS-LINKABLE STRUCTURALLY COLORED POLYMERS, THEIR PREPARATION AND THEIR USE IN COMPOSITIONS FOR COATINGS

INTRODUCTION

The present invention relates to new cross-linkable structurally colored polymers, used especially for the production of colored coatings on various supports such as, but not limited to, metal, paper and textile materials. The invention also relates to a process for the preparation of these polymers, the coating compositions containing these polymers as a constituent and the coatings obtained by means of these compositions.

BACKGROUND OF THE INVENTION

The formation of colored coatings on various supports by application of a colored composition to these supports followed by drying and thermo-cross-linking has been known for a long time. This prior art technique has a number of disadvantages including bulky installations, a large energy consumption owing to the fact that it is necessary to remove the solvent and heat the support and the coating, possible deterioration of the support during the treatment or at least alteration of some of its properties, and problems of safety and toxicity connected with the use of certain solvents.

It has also been proposed in the prior art to replace the thermo-cross-linking by photo-cross-linking; i.e. cross-linking under the influence of ultra-violet rays which considerably restricts the above disadvantages.

However, whether photo-cross-linking or thermo-cross-linking is used, the colored compositions used so far in the prior art for coatings contain, in the form of different entities, a cross-linkable colorless polymer on the one hand and a pigmentary dye on the other hand, which exhibit the following disadvantages:
  the necessity to put the dye in pigment form, which is often difficult, lengthy and costly.
  during the storage of the compositions, the dispersed pigment can separate or undergo undesirable changes such as crystallization or alteration of physical form.
  the pigment remains chemically independent of the coating after the cross-linking and may then migrate, with resulting loss of quality of the coating and possibly problems of toxicity.
  during the photo-cross-linking, the solid particles of pigment absorb a considerable amount of light energy, which necessitates increase in the time of irradiation and/or the amount of photo-initiator in the compositions. The increase in the quantity of photo-initiator has a very unfavorable influence on the stability on storage of the compositions and somewhat reduces the quality of the coating as a result of heterogenity due to the photo-initiator residues.

SUMMARY OF THE INVENTION

It has now been found according to the present invention that it is possible to obtain colored compositions for coating which are not subject to the previous disadvantages and which are capable of producing coatings of better quality than those obtained with the prior art compositions. The new compositions of the present invention are characterized by the fact that they contain, as constituents, one or more polymers of low molecular weight referred to hereinafter as "oligomers," which are structurally colored; that is, containing as an integral part of their chemical structure, chromophor or color-carrying groups and which oligomers are cross-linkable.

More particularly, the invention pertains to structurally colored polymers, based on monomers of the acrylic type, containing 0.5% to 20% by weight of dyestuff in the copolymerized or grafted form, wherein the polymers have a number-average molecular weight between 1000 and 12,880 g. and carry m hydroxy functions and n groups of the formula:

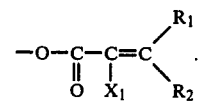

In this formula $X_1$ is hydrogen, chlorine, bromine or methyl;

and $R_1$ and $R_2$ are the same or different and represent hydrogen, chlorine, methyl, phenyl, substituted phenyl or carboxyl;

m is a number from 0 to 49 and n a number from 2 to 70 such that the sum $m+n$ is from 7 to 70 and the ratio $m/n$ is from 0 to 2.4.

A further feature of the invention resides in a process for the preparation of the polymers defined above which comprises:

(a) the preparation of a structurally colored oligomer containing $m+n+x$ hydroxy functions, m and n being such as defined above and x being between 0 and $m+n15$, by free radical polymerization of one or more monomers of the formula:

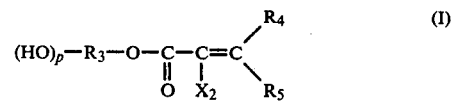

in which $X_2$ is hydrogen or methyl;

$R_4$ and $R_5$ are the same or different and represent hydrogen, or methyl, phenyl or substituted phenyl;

$R_3$ is an aliphatic, linear or branched, hydrocarbon, possibly substituted by chlorine, containing from 2 to 7 carbon atoms or a polyethyleneoxy or polypropyleneoxy chain containing 1, 2 or 3 monomer units and p is equal to 1 or 2, in the presence of one or more dyestuffs containing one or two groups of the formula

in which $X_1$ is as above;

and $R_6$ and $R_7$ are the same or different and represent hydrogen, methyl, phenyl, substituted phenyl, cyano or carboxyl; and/or one or more groups reactive towards hydroxy functions;

(b) the conversion of n hydroxy functions of the oligomer prepared in (a) into groups

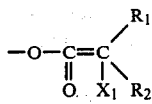

by reaction of the said oligomer with a compound of the formula

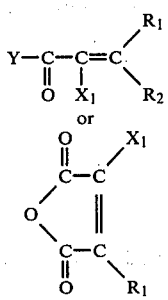

in which Y is chlorine or bromine;

and $X_1$, $R_1$, $R_2$ have the same significance as above;

optionally in the presence of one or more dyestuffs containing one or two groups reactive towards hydroxy functions, the amounts of compound of formula (II) or (II bis) and of dyestuff introduced being calculated so as to act respectively on n and x of the hydroxy functions of the oligomer formed in (a), the total amount of dyestuff used in the stages (a) and (b) representing 0.5% to 20% by weight of the whole of the compounds used.

DETAILED DESCRIPTION OF THE INVENTION

The oligomers formed in accordance with the present invention are based on monomers of the acrylic type. They have a number-average molecular weight of between 1000 and 12,880 g., preferably between 2000 and 5000 g., and contain 0.5% to 20% by weight of a dyestuff, in copolymerized or grafted form. Further, they contain m hydroxy (OH) functions and n groups of the formula

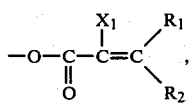

in which $X_1$ is hydrogen, chlorine, bromine or methyl;

$R_1$ and $R_2$ are the same or different and represent hydrogen, chlorine, methyl, phenyl, substituted phenyl or carboxyl;

m is a number from 0 to 49 and n is a number from 2 to 70 such that the sum m+n is from 7 to 70 and the ratio m/n is from 0 to 2.4.

Preferably both m and n are numbers from 2 to 49 such that the sum m+n is from 7 to 70 and the ratio m/n is from 0.4 to 2.4.

The oligomers defined above are new and as such form part of the invention.

Structurally colored polymers having contents of dyestuff identical with those of the oligomers according to the invention are known; see, for example, *Encyclopedia of Polymer Science and Technology*, 1971, 15, 314–319, and French Patent Nos. 74/26846 and 74/26847 filed on Feb. 8, 1974 in the name of the applicants. However, these prior known polymers, contrary to the oligomers according to the invention, do not contain groups with the structure

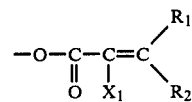

and are not cross-linkable.

The oligomers according to the invention may be obtained by the following process, which has two successive stages. In the first stage (stage a), a structurally colored oligomer is prepared containing m+n+x hydroxy functions, m and n being as defined above and x being between 0 and m+n/5. The reaction is carried out by free radical polymerization of one or more colorless hydroxyacrylic monomers, in the presence of one or more dyestuffs containing in their molecule one or two groups having a polymerizable ethylenic double bond and/or one or more groups reactive with respect to the hydroxy functions of the colorless monomers.

In a second stage (stage b), n of the OH functions of the colored oligomer prepared in stage (a) are converted into groups of the formula:

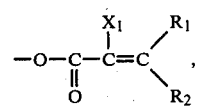

by reacting the said oligomer with an unsaturated compound containing a group reactive towards the OH functions, optionally in the presence possibly of one or more dyestuffs having in their molecule one or two groups reactive towards hydroxy functions. The amounts of unsaturated compound and dyestuff introduced in this stage being calculated so as to act respectively on the n and x hydroxy functions of the oligomer. The total amount of dyestuff used in the stages (a) and (b) represents 0.5% to 20% by weight of the total of the compounds used.

Although, according to the process described above, the dyestuff may be introduced into the structure of the oligomer either in stage (a) by copolymerization with the hydroxyacrylic monomers owing to the opening of the polymerizable ethylenic double bond, or during stage (a) or (b), by grafting through the means of the reaction between the groups reactive towards OH and the OH functions of the oligomer, or again by both methods at once; preferably the method of incorporation of the dyestuff in the oligomer by copolymerization with the hydroxyacrylic monomers is used. In this preferential method of incorporation, the dyestuff used then has necessarily one or two groups having a polymerizable ethylenic double bond, the hydroxylated oligomer formed in stage (a) only containing m+n hydroxy functions (x is equal to 0) and stage (b) is carried out in the absence of dyestuff.

The free radical polymerization of stage (a) is a polymerization in solution. It is effected, according to the conventional techniques, in an inert solvent, in the presence of an initiator of free radical polymerization and possibly of a chain transfer agent. Although it is not absolutely necessary, the solvent and the initiator are preferably selected so that the medium obtained at the end of the polymerization is sutable for stage (b) of the process, which has the advantage of avoiding the isolation of the hydroxylated oligomer formed in stage (a). Examples of such preferred solvents are dimethylformamide, dimethylacetamide and N-methyl pyrrolidone. Examples of preferred initiators are azo-bis-isobutyronitrile and the organic peroxides. Lastly, examples of chain transfer agents include alkylmercaptans such as n-dodecyl-mercaptan.

The colorless hydroxyacrylic monomers used in stage (a) correspond to the general formula:

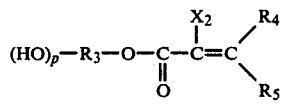

in which $X_2$ is hydrogen or methyl;

$R_4$ and $R_5$ are the same or different and represent hydrogen, methyl, phenyl or substituted phenyl;

$R_3$ is an aliphatic, linear or branched, hydrocarbon, possibly substituted by chlorine, containing 2 to 7 carbons or else a polyethyleneoxy or polypropyleneoxy chain containing 1, 2 or 3 monomer units, and p is 1 or 2.

Illustrative of the compounds of formula (I) are among others, 2-hydroxyethyl acrylate; 2,3-dihydroxypropyl acrylate, diethyleneglycol monoacrylate, 3-chloro-2-hydroxypropyl acrylate, 6-hydroxyhexyl acrylate, and the corresponding derivatives of methacrylic acid.

The unsaturated compounds containing a reactive group with respect to the hydroxy functions used in stage (b) correspond to one of the formulae:

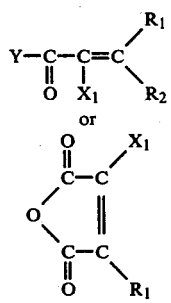

in which Y is chlorine or bromine;

and $X_1$, $R_1$, $R_2$ have the same significance as above.

Examples of the compounds of formula (II) are acryloyl, methacryloyl, α-bromo-acryloyl and α-chloroacryloyl chlorides.

Illustrative of the compounds of formula (II bis) are among others, maleic anhydride, chloromaleic anhydride and citraconic anhydride.

The dyes having one or two polymerizable ethylenic double bonds and/or one or more groups reactive with respect to the hydroxy functions, which are used in the process of the invention, may belong to very diverse classes such as, for example, the azo, anthraquinone, perinone, perylene-tetracarboxylic acid derivatives, phthalocyanines, dioxazines, quinacridones and quinophthalones classes. These dyes contain as groups having a polymerizable ethylenic double bond, one or two groups of the general formula:

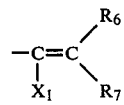

in which $X_1$ has the same meaning as above and $R_6$ and $R_7$ are the same or different and represent hydrogen, methyl, phenyl, substituted phenyl, cyano or carboxylic. The groups of formula (III) are attached to a ring of the dye molecule either directly or through the bridge of a group such as, for example,

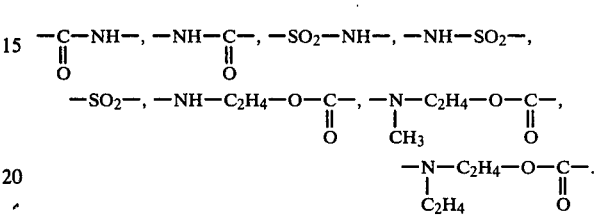

Examples of groups of formula (III) are the vinyl, β-cyanovinyl and α-bromovinyl groups.

Examples of groups reactive towards the OH functions contained by the dyes used in the process according to the invention are groups containing an activated halogen atom such as the groups

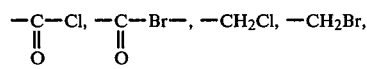

the carboxylic anhydride group, the isocyanate group and the epoxy group.

The dyestuffs used in stage (a) may carry hydroxy groups. However, the hydroxy functions of the oligomer formed in this stage are preferably introduced by the intermediary of the hydroxyacrylic monomer or monomers.

Numerous dyestuffs containing in their molecule one or more groups of formula (III), and/or one or more groups relative towards hydroxy functions are known. Illustrative of examples of dyestuffs are those described in French Patent Nos. 1,083,584; 1,118,705; 1,207,925; 1,291,903; 1,295,638 1,394,020, 2,016,740 and 2,091,873 and the British Pat. Nos. 1,036,700 and 1,262,092, and German patent application No. 1,056,580. These disclosures are relied on for exemplification of suitable dyestuffs.

The choice of the dyestuff or dyestuffs used in the process depends upon the desired shade and the desired fastness and takes into account the compatibility of the physico-chemical and chemical characteristics of the dyestuff with the proposed use. Preferably dyestuffs are used which are soluble in the polymerization medium, copolymerize suitably with the hydroxyacrylic monomer or monomers, and have a high tinctorial power and a good fastness to light. These are matters well within the scope of the skilled worker in the art.

The cross-linkable structurally colored oligomers according to the invention are solids which may be kept, after having stabilized them with an inhibitor of free radical polymerization, such as hydroquinone, in order to avoid any premature polymerization. They are compatible; that is, several oligomers, for example of different shades, may be mixed so as to obtain composite shades.

The oligomers according to the invention may be used as coloring material for coloring inks, varnishes, paints or printing pastes. However, their preferred use resides in use as a constituent of compositions for cross-linkable coating, and more especially of photo-cross-linkable compositions. When incorporated in such compositions, the oligomers readily produce the filmogenic character, the properties of adhesiveness to the support, the color and its permanence.

The coating compositions prepared by means of the oligomers according to the invention provide, for example, on aluminum, paper, pasteboard or fabric, coatings having a very great homogenity of coloration, a very great transparency and remarkable fastness; especially a remarkable fastness to solvents. They show also, with respect to the cross-linking compositions conventionally used, great advantages in the ease of preparation. Many surfaces or supports may be coated with the colored polymer compositions of this invention.

Photo-cross-linkable compositions, like with conventional photo-cross-linkable inks, usually contain five types of constituents, namely:
 a colorless polymeric base containing polymerizable ethylenic double bonds
 mono or polyfunctional (i.e. having one or more polymerizable ethylenic double bonds) acrylic monomers
 one or more photo initiators
 one or more adjuvants
 a pigment.

Now on the one hand the incorporation of the pigment is always a difficult operation to carry out and is delicate, since it may be accompanied by a degradation of the pigment; i.e. loss of coloring power, modification of shade or by a disturbance of the physico-chemical characteristics of the mixture; e.g. modification of the viscosity, etc. On the other hand, since the properties of the coatings obtained after cross-linking are frequently very sensitive to slight modifications of the formulation, it is necessary to carry out numerous tests to determine the optimum proportions of the various constituents.

In the case of cross-linking compositions prepared with the oligomers according to the invention, the difficulties of preparation connected with the incorporation of a pigment are prevented, since the two-component colorless polymeric base-pigment is replaced by a single entity; i.e. a cross-linkable structurally colored oligomer according to the invention.

The latter are very soluble in the mono or polyfunctional acrylic monomers, from which there is a very rapid homogenization of the compositions. In other respects, the properties of the coatings obtained by means of the compositions according to the invention are less sensitive to the variations of formulation than those of the coatings obtained with the conventional compositions.

Further, the yield of the photo-cross-linking process is improved in the case of the photo-cross-linkable compositions according to the invention, which enables smaller quantities of photo initiator to be used than in the case of the conventional photo-cross-linkable compositions.

The following examples, in which the parts indicated are parts by weight, illustrate the invention without restricting it in anyway. The values for average molecular weight and intrinsic viscosity provided in these examples are given at about ±10% and about ±5%, respectively. The intrinsic viscosity has been determined in dimethylformamide at 25° C.

EXAMPLE 1

250 parts of pure and anhydrous dimethyl formamide, 100 parts of 2-hydroxy-ethyl methacrylate and 10 parts of the unsaturated dyestuff of the formula:

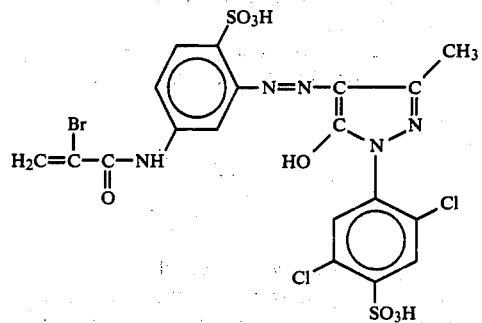

are introduced into a reactor provided with a stirring device, an inlet tube for nitrogen and a temperature regulator.

Then 0.8 parts of n-dodecyl-mercaptan and 1.65 parts of azobisisobutyronitrile are introduced, and the solution is deoxygenized by a current of nitrogen. It is then brought rapidly to (80±2)°C., while stirring, and this temperature is maintained for about 6 hours.

It is then cooled and diluted with 100 to 200 parts of pure and anhydrous dimethylformamide, and then 0.5 parts of hydroquinone and 1.2 parts of triethylamine are added.

The temperature is brought to 50°-60° C. and 34.8 parts of distilled acryloyl chloride which corresponds to the conversion of about 50% of the OH of the polymer obtained in the previous stage are introduced in one hour to 1½ hours. After the end of the introduction, this temperature is maintained for one to two hours. Then after cooling, the polymer obtained is precipitated by pouring the reaction medium into a non-solvent, for example, water. It is filtered off, washed and dried under vacuum at ordinary temperature, after stabilization by addition of 200 to 1000 ppm of hydroquinone.

The yellow product obtained has an average molecular weight of 4500 g. and an intrinsic viscosity $[\eta]=0.18$ deciliter/g.

EXAMPLE 2

The process is as in Example 1, but the 34.8 parts of acryloyl chloride are replaced by 40.2 parts of methacryloyl chloride. The product obtained has physico-chemical characteristics similar to those of the product of Example 1.

EXAMPLE 3

The process is as in Example 1, but 200 parts of dimethyl formamide, 0.6 parts of n-dodecyl-mercaptan and 1.3 parts of azobisisobutyronitrile are used in the first stage.

The copolymer obtained has an average molecular weight of 5000 g. and an intrinsic viscosity $[\eta]=0.22$ deciliter/g.

EXAMPLE 4

The first stage polymerization is effected as in Example 1, then the medium is cooled, diluted with 100 to 200 parts of pure and anhydrous dimethyl formamide and 0.5 parts of hydroquinone are added.

The temperature of the solution is raised to 75° C.–85° C. and 30.8 parts of maleic anhydride (which corresponds to the conversion of about 40% of the OH) are gradually introduced. The copolymer is isolated as in Example 1.

EXAMPLE 5

The process is as in Example 1, but 2-hydroxy-ethyl acrylate is used as monomer instead of the 2-hydroxy-ethyl methacrylate. The colored copolymer obtained has an average molecular weight of 3500 g. and an intrinsic viscosity $[\eta]=0.17$ deciliter/g.

EXAMPLE 6

The process is as in Example 1, but 5 parts of the dyestuff of the following formula are used:

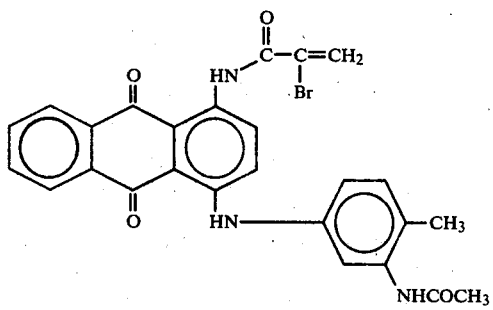

EXAMPLE 7

A photo-cross-linkable composition is prepared at a temperature $\leq 60°$ C. by means of the polymer of Example 1. For this purpose, 28.5 parts of the polymer prepared in Example 1 are introduced into 30 parts of 2-hydroxy-ethyl acrylate, then 30 parts of trimethylolpropane triacrylate, 10 parts of pentaerythritol triacrylate and finally 1.5 parts of benzoin monobutyl ether are added. In a few minutes a homogeneous photo-cross-linkable composition is obtained.

This composition, applied on an aluminum plate in a layer of thickness 24μ, is photo-cross-linked in less than one second. The intense yellow film obtained has a good adherence, is stable towards solvents and very transparent. It may be covered over with other layers without any migration between the layers occurring.

EXAMPLE 8

A photo-cross-linkable composition is prepared, at a temperature $\leq 60°$ C., containing 30 parts of the colored polymer of Example 6, 15 parts of 2-hydroxy-ethyl acrylate, 15 parts of benzyl acrylate, 20 parts of hexanediol diacrylate, 20 parts of pentaerythritol triacrylate and 1.5 parts of benzoin monoethyl ether. This composition, when applied on aluminum and photo-cross-linked, gives a blue film having good general characteristics and fastness.

EXAMPLES 9 TO 13

The operation is as in Example 1, but the dyestuffs of the following Table are used.

The colored copolymers obtained are incorporated in photo-cross-linkable compositions prepared according to the process of Examples 7 or 8. These compositions, applied on paper, give prints of very good quality.

| DYESTUFFS | OBTAINED | EX. |
|---|---|---|
| [structure with H, NC, C=CH, N=N, CONH2, HO, phenyl] | Orange | 9 |
| [structure with Cl, N=N, C2H5, CH3, C2H4O—C—CH=CH2] | Red | 10 |
| [structure with H2C=CH—SO2, OH, N=N, HO3S, OH, NHCOCH3, Cu Complex, SO3H] | Violet | 11 |
| [structure with H2C=CH—SO2—NH, N=N, CH3, HO, Cl, HO3S] | Yellow | 12 |
| [structure with Br, H2C=C—C=NH, NHCH3, N=N, SO3H, HO, SO3H] | Red | 13 |

EXAMPLE 14

The process is as in Example 1, but the 0.8 parts of n-dodecyl-mercaptan are replaced by 2 parts of the same product. The copolymer obtained has a number-average molecular weight of 3500 and an intrinsic viscosity $[\eta]=0.13$ deciliter/g.

EXAMPLE 15

The process is as in Example 14, but the 34.8 parts of acryloyl chloride are replaced by 70 parts of the same product, so as to transform all OH groups of the polymer obtained in the first stage. The copolymer obtained has a number-average molecular weight of 4500 and an intrinsic viscosity $[\eta]=0.17$ deciliter/g.

EXAMPLE 16

250 parts of pure and anhydrous dimethylformamide, 100 parts of 2-hydroxyethyl methacrylate, 2 parts of n-dodecyl mercaptan and 1.65 parts of azobisisobutyronitrile are introduced into a reactor provided with a stirring device, an inlet tube for nitrogen and a temperature regulator.

The solution is deoxygenized by a current of nitrogen, then brought rapidly to $(80\pm2)°C$., while stirring. This temperature is maintained for about 6 hours.

The solution is then cooled and diluted with 100 to 200 parts of pure and anhydrous N,N-dimethylformamide, and then are added 10 parts of the dyestuff of the formula:

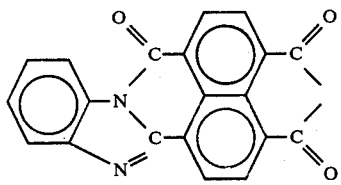

The temperature is raised to $100°$–$110°$ C. This temperature is maintained for about 8 hours.

The medium is then cooled to $50°$–$60°$ C. and 0.5 parts of hydroquinone are added. The condensation with acryloyl chloride is effected as in Example 1.

The yellow copolymer obtained has a number-average molecular weight of 4000 and an intrinsic viscosity $[\eta]=0.17$ deciliter/g.

EXAMPLE 17

A photo-cross-linkable composition is prepared, at a temperature $\leq 60°$ C., containing 40 parts of the copolymer of Example 15, 15 parts of 2-hydroxyethyl acrylate, 40 parts of trimethylolpropane triacrylate, 5 parts of pentaerythritol triacrylate and 1 part of benzoin monobutyl ether. This composition when applied on a white cardboard in a layer of thickness of 12μ, is photo-cross-linked in less than one second. The yellow film obtained feels dry and is stable towards solvents and very transparent. It may be covered over with other layers without any migration between the layers occurring.

Further embodiments, variations and modifications of the present invention will be apparent from the foregoing specification to persons having ordinary skill in the art.

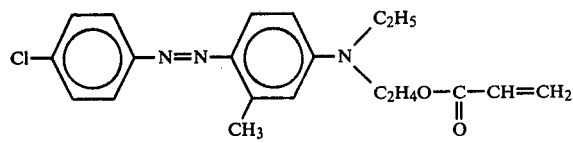

We claim:

1. A structurally colored polymer having a number-average molecular weight between 1000 and 12,880 g and carrying m hydroxy functions and n groups of the formula:

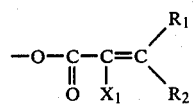

in which $X_1$ is a member selected from hydrogen and methyl, $R_1$ and $R_2$ are the same or different and represent a member selected from hydrogen and methyl, m is a number from 0 to 49 and n is a number from 2 to 70 such that the sum m+n is from 7 to 70 and the ratio m/n is from 0 to 2.4, said polymer being obtained by:

(a) first preparing a structurally colored oligomer containing m+n hydroxy functions, m and n being as defined above, by free radical polymerization of one or more monomers of the formula:

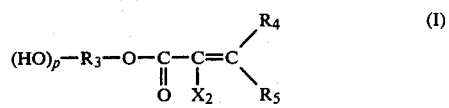

in which $X_2$ is a member selected from hydrogen and methyl, $R_4$ and $R_5$ are the same or different and represent a member selected from hydrogen and methyl, $R_3$ is an aliphatic linear or branched hydrocarbon containing from 2 to 7 carbon atoms or said hydrocarbon substituted by chlorine, and p is equal to 1 or 2, in the presence of one or more dyestuffs containing one or two groups of the formula:

in which $X_1$ is as defined above, and $R_6$ and $R_7$ are the same or different and represent a member selected from hydrogen and methyl, and containing no group reactive towards hydroxy functions, and (b) converting n hydroxy functions of the oligomer prepared in (a) into groups of the formula:

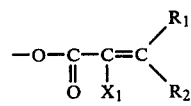

by reaction of the said oligomer with a compound of the formula:

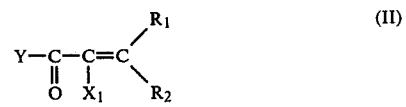

in which Y is a member selected from chlorine and bromine, and $X_1$, $R_1$, $R_2$ have the same definition as above, in the absence of dyestuff, the amount of compound of formula (II) introduced being calculated to act on n of the hydroxy functions of the oligomer formed in (a), the total amount of dyestuff used representing 0.5% to 20% by weight of the whole of the compounds used.

2. A polymer as defined in claim 1 wherein said polymer has a number-average molecular weight from 2000 to 5000 g.

3. A polymer as defined in claim 1 wherein both m and n are numbers from 2 to 49 such that the sum m+n is from 7 to 70 and the ratio m/n is from 0.4 to 2.4.

4. A colored composition for coating, which contains at least one structurally colored polymer having a number-average molecular weight between 1000 and 12,880 g as defined in claim 1.

5. A colored coating obtained by the process of coating a surface with the composition defined in claim 4.

6. A polymer according to claim 1, 2 or 3 in which all m+n hydroxy functions of the oligomer formed in (a) being derived from the hydroxyacrylic monomer or monomers of formula (I).

7. A polymer as defined in claim 6 in which the dyestuff used in (a) has the formula: